United States Patent
Karstens et al.

(10) Patent No.: US 7,242,963 B1
(45) Date of Patent: Jul. 10, 2007

(54) SYSTEM AND METHOD FOR USING A WIRELESS ENABLED PORTABLE COMPUTER SYSTEM AS A WIRELESS MODEM

(75) Inventors: Rich Karstens, Lake Forest Park, WA (US); Ryan Robertson, Seattle, WA (US); David Kammer, Seattle, WA (US)

(73) Assignee: Palm, Inc., Sunnyvale, CA (US)

(*) Notice: Subject to any disclaimer, the term of this patent is extended or adjusted under 35 U.S.C. 154(b) by 317 days.

(21) Appl. No.: 10/824,756

(22) Filed: Apr. 14, 2004

Related U.S. Application Data

(63) Continuation of application No. 09/801,532, filed on Mar. 7, 2001, now Pat. No. 6,745,047.

(51) Int. Cl.
*H04Q 7/20* (2006.01)
(52) U.S. Cl. ............... 455/557; 455/556.1; 455/556.2; 455/41.3
(58) Field of Classification Search ............ 455/550.1, 455/556.1, 556.2, 557, 90.1, 575.1, 90.3, 455/558, 544–546, 41.2, 418–420, 41.3, 455/517; 375/220–221; 370/386; 709/232
See application file for complete search history.

(56) References Cited

U.S. PATENT DOCUMENTS

| | | | | | |
|---|---|---|---|---|---|
| 5,873,045 | A | * | 2/1999 | Lee et al. | 455/556.2 |
| 5,974,334 | A | * | 10/1999 | Jones, Jr. | 455/556.2 |
| 6,188,917 | B1 | * | 2/2001 | Laureanti | 455/573 |
| 6,285,889 | B1 | * | 9/2001 | Nykanen et al. | 455/557 |
| 6,327,152 | B1 | * | 12/2001 | Saye | 361/732 |
| 6,553,240 | B1 | * | 4/2003 | Dervarics | 455/566 |
| 6,577,622 | B1 | * | 6/2003 | Schuster et al. | 370/352 |
| 6,600,421 | B2 | * | 7/2003 | Freeman | 340/573.1 |
| 6,950,677 | B2 | * | 9/2005 | Lo et al. | 455/557 |
| 6,950,859 | B1 | * | 9/2005 | Bartek et al. | 709/217 |
| 6,952,617 | B1 | * | 10/2005 | Kumar | 700/1 |
| 7,076,239 | B2 | * | 7/2006 | Kirkup et al. | 455/411 |
| 2004/0097264 | A1 | * | 5/2004 | Bodnar et al. | 455/556.1 |

* cited by examiner

*Primary Examiner*—Pablo N. Tran

(57) ABSTRACT

A method and system for using a wireless enabled portable computer system as a wireless modem. The portable computer system may be a personal digital assistant (PDA) having an internal wireless modem. The internal wireless modem, e.g., GSM radio, contains a communication port (port2) that communicates with a processor of the portable computer system. The portable computer system also contains another communication port (port1) that is externally available for connection to a second computer system. A software bridge is provided that copies commands and/or data from the port1 over to the port2 and vice-versa. The software bridge allows the second computer system to directly use the internal wireless modem of the portable computer system when the portable computer system is connected to the second computer. The connection to the second computer system can be made by a wired connection (e.g., serial interface, RS232) or by a wireless connection, e.g., Bluetooth or infra-red communication. The port1 and the port2 can be serial communication ports which may be UART compliant. The PDA thus extends wireless functionality to a second computer system (e.g., a notebook) using conventional connection mechanisms for communicating with the second computer system.

16 Claims, 13 Drawing Sheets

SYSTEM AND METHOD FOR USING A WIRELESS ENABLED PORTABLE COMPUTER SYSTEM AS A WIRELESS MODEM

This is a continuation of copending application Ser. No. 09/801,532 filed on Mar. 7, 2001 now U.S. Pat. No. 6,745, 047 which is hereby incorporated by reference to this specification.

BACKGROUND OF THE INVENTION

1. Field of the Invention

The present invention relates to the field of data processing. More specifically, embodiments of the present invention relate to wireless communication using a portable computer system and a second ("host") computer system.

2. Related Art

As the components required to build a computer system have reduced in size, new categories of electronic devices and computer systems have emerged. One of the new categories of computer systems is the "palmtop" computer system. A palmtop computer system is a computer that is small enough to be held in the hand of a user and can therefore be "palm-sized." Most palmtop computer systems are used to implement various Personal Information Management (PIM) applications such as an address book, a daily organizer (calendar, datebook, etc.) and electronic notepads, to name a few. Palmtop computers with PIM software have been know as Personal Digital Assistants (PDAs). Many PDAs have a small and flat display screen associated therewith.

User convenience and device value are very important factors for portable electronic devices. Typically, portable electronic devices are employed while the user is on the run, e.g., in business meetings, on business travel, personal travel, in a vehicle, on foot, etc. Because the user may be occupied or busy while using the portable electronic device, the number of user steps or user tasks required in order to access information from an electronic device (or to store information into the electronic device) is crucial for producing a commercially successful and useful product. That is, the more difficult it is to access data from an electronic device, the less likely the user will perform those tasks to obtain the information. Likewise, the easier information is to obtain, the more likely the portable electronic device will be used to obtain that information and the more likely the portable electronic device will become a part of the user's everyday activities.

Similarly, the more useful the device, the more the device will be used and acquired. The functionality of mobile wireless devices is undergoing a transition. Mobile devices are evolving from a single application device with dedicated specific purpose communication channel (for example, a cell phone or pager), to more general-purpose devices with more flexible data communication capabilities.

More specifically, wireless technology is advancing, both in the number of options that are available for providing connectivity, and in their flexibility to provide general purpose data communication. Different technologies such as cellular technologies (e.g., CDMA, TDMA), LAN access technologies (e.g., IEEE 802.11, HomeRF) and PAN technologies (e.g., Bluetooth, IR) each address a different set of needs, and provide different set of potential services. Mobile devices are no longer also restricted to one communication channel. Modular mobile devices allow network interfaces to be attached, allowing for unlimited communications configurations. In addition, Bluetooth technology allows a single mobile device to be simultaneously in access multiple piconets through a single interface.

To facilitate mobile wireless communication, several wireless modem peripheral devices are available that can be directly connected to the serial interface port of a host computer system thereby providing wireless communication to the host computer system, e.g., a laptop computer. The serial interface on the wireless modem peripheral is reserved for this type of connection. Additionally, some cell phones having built-in modems also provide an interface that is reserved for the host computer system thereby providing wireless communication to the host computer system. However, cell phone interfaces tend to be complex and non-standard. Few computer users have the required cabling to make them work. As cellular phone functionality and wireless modem functionality are integrated into PDAs, a problem has arisen in that conventional PDAs heretofore do not offer a convenient (or any) mechanism for providing wireless communication to a host computer system using their internal resources as do conventional cell phones and wireless modem peripherals.

SUMMARY OF THE INVENTION

Accordingly, what is needed is a method and system allowing a PDA to use its internal resources to act as a peripheral device for a connected host computer system. Further, what is needed is a system and method allowing a PDA to provide wireless communication functionality to a connected host computer system using its internal wireless modem. What is also needed is such a system that does not require any additional physical connection resources (to the host computer system) that are not already present in the equipment of a conventional PDA. What is further needed is a mechanism that allows a host computer system to use a connected PDA as a wireless modem peripheral. Using such a method and system, a PDA could extend wireless functionality to a host computer system and thus increase the value of the PDA to the user. Embodiments of the present invention provide the above advantages and others not specifically mentioned above but described in the sections to follow.

A method and system are described for using a wireless enabled portable computer system as a wireless modem. The portable computer system may be a personal digital assistant (PDA) having an internal wireless modem. The internal wireless modem, e.g., GSM radio in one embodiment, contains a communication port (port2) that communicates with a processor of the portable computer system. The portable computer system also contains another communication port (port1) that is externally available for connection to a second computer system. A software bridge is provided that copies commands and/or data from the port1 over to the port2 and vice-versa.

The software bridge allows the second computer system to directly use the internal wireless modem of the portable computer system when the portable computer system is connected to the second computer system. The connection to the second computer system can be made by a wired connection (e.g., serial interface, RS232) or by a wireless connection, e.g., Bluetooth or infra-red communication. The port1 and the port2 can be serial communication ports which may be UART compliant. The PDA thus extends wireless functionality to a second computer system (e.g., a notebook) using conventional connection mechanisms for communicating with the second computer system. In one embodiment, any wirelessly enabled PDA can be placed in its cradle (which is coupled to a host computer system) and can readily be used as a wireless modem peripheral by the host computer system.

Regarding other embodiments, in the case where the second or "host" computer system is a PPP (point-to-point protocol) client and the wireless communication is not PPP compliant, the internal modem may provide translation to the PPP protocol. In this case, the processor receives PPP compliant communication. Alternatively, the software bridge may provide this translation if the internal modem provides non-PPP information to the processor.

More specifically, an embodiment of the present invention includes a personal digital assistant comprising: a first communication port accessible from an external communication connector, the external communication connector for coupling with a host computer system; an internal wireless communication device configured to communicate with a second communication port that is internal to the personal digital assistant and wherein the second communication port is not directly accessible by the external communication connector; a memory; and a processor coupled to communicate with the first communication port and the second communication port and coupled to the memory, the processor operable to make the internal wireless communication device accessible to the host computer system by executing instructions stored in the memory that implement a communication bridge providing communication between the first communication port and the second communication port.

Another embodiment of the present invention includes a computer system comprising: a host computer system; a portable computer system communicatively coupled to the host computer system and comprising: a first communication port directly accessible from an external communication device, the external communication device for communicating with the host computer system; an internal wireless communication device configured to communicate with a second communication port that is internal to the portable computer system and that is not directly accessible by the external communication device; a memory; and a processor coupled to communicate with the first communication port and the second communication port and coupled to the memory, the processor operable to make the internal wireless communication device accessible to the host computer system by executing instructions stored in the memory that implement a communication bridge between the first communication port and the second communication port.

DETAILED DESCRIPTION OF THE INVENTION

Figure 1:
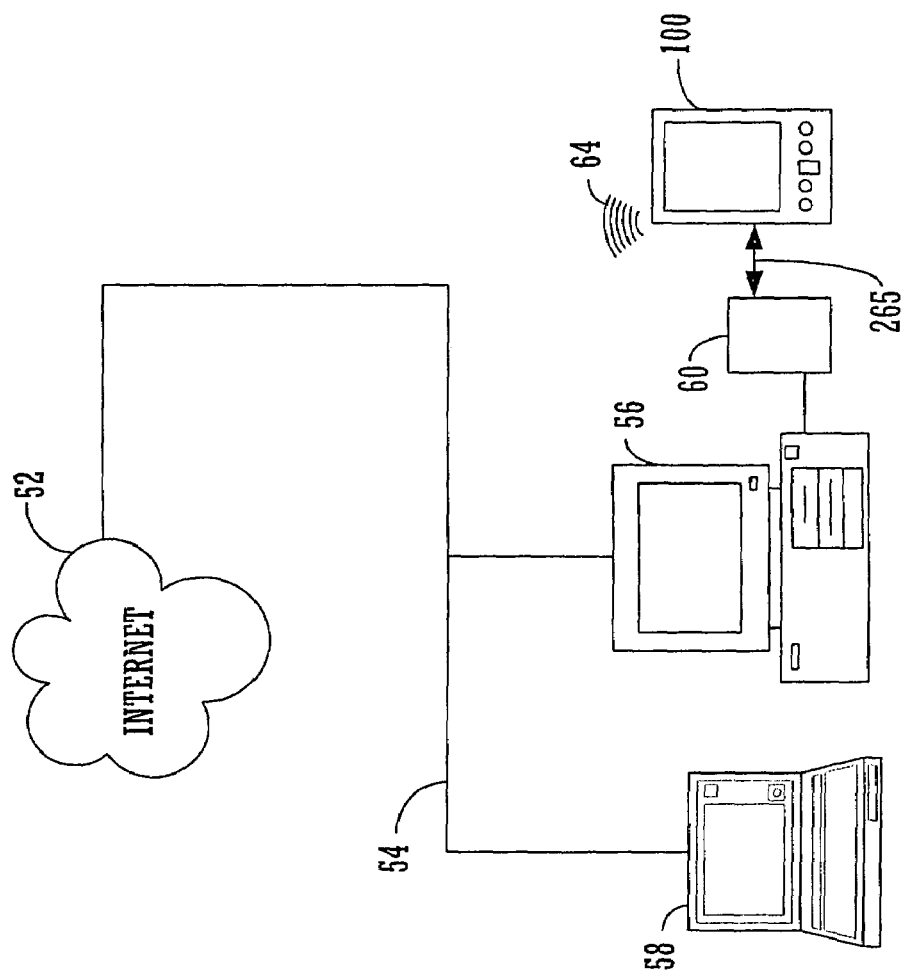
FIG. 1 is system illustration of a palmtop or "palm sized" computer system connected to other computer systems and the Internet via a cradle device.

In the following detailed description of the present invention, a method and system for using a wireless enabled portable computer system as a wireless modem peripheral for a host computer system, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Notation and Nomenclature

Some portions of the detailed descriptions which follow (e.g., process 400 of FIG. 7) are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "checking," "accessing" or "processing" or "computing" or "suspending" or "resuming" or "translating" or "calculating" or "determining" or "scrolling" or "displaying" or "recognizing" or "executing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Exemplary Palmtop Computer System Platform

The processes of the present invention described herein are particularly applicable to portable computer systems called personal digital assistants (PDA). These devices include, for instance, intelligent cell phones, computerized pagers and portable computer systems. Although applicable across a wide variety of platforms and devices, the present invention is described herein by example with respect to a portable or mobile computer system.

FIG. 1 illustrates an exemplary networked system 50 that can be used in conjunction with an embodiment of the present invention. System 50 is exemplary only and comprises a host computer system 56 which can either be a desktop unit as shown, or, alternatively, can be a laptop system 58. Optionally, one or more host computer systems can be used within system 50. Host computer systems 58 and 56 are shown connected to a communication bus 54, which in one embodiment can be a serial communication bus, but could be of any of a number of well known designs, e.g., a parallel bus, Ethernet Local Area Network (LAN), etc. Optionally, bus 54 (or a separate communication channel) can provide communication with the Internet 52 using a number of well known protocols.

Importantly, a communication link is also coupled to a cradle 60 (or cable dock) for receiving and initiating communication with an exemplary palmtop ("palm-sized") portable computer system 100 over line 265. Cradle 60 provides an electrical and mechanical communication interface between the computer system 100 for two way communications. In one embodiment, the communication link including cradle 60 and line 265 is a serial communication link or can be a USB link. Computer system 100 may also contain a wireless infrared communication mechanism 64 for sending and receiving information to or from other devices. As discussed more fully below, computer system 100 also contains one or more other wireless communication mechanisms, e.g., cellular phone, Bluetooth and/or wireless LAN (e.g., IEEE 802.11), for instance, all of which can be used to establish the communication link between the portable computer system 100 and the host computer system. As described further below, embodiments of the present invention facilitate the use of the portable computer system 100 as a peripheral to the host computer system thereby leveraging the communication link between the two devices.

Figure 2A:
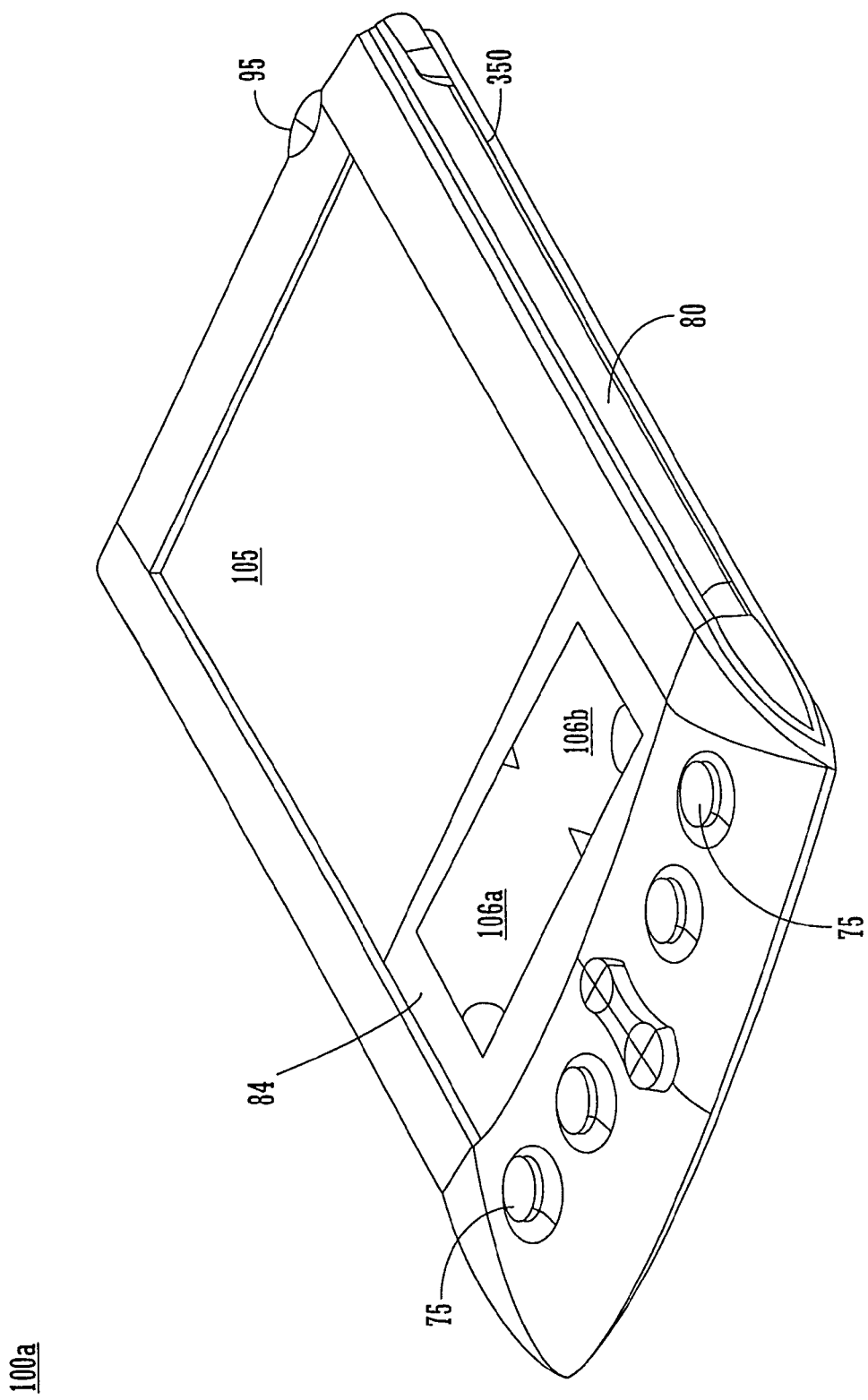
FIG. 2A is a top side perspective view of an exemplary palmtop computer system.

FIG. 2A is a perspective illustration of the top face 100a of one embodiment of the palmtop computer system. The top face 110a contains a display screen 105 surrounded by a bezel or cover. A removable stylus 80 is also shown. The display screen 105 contains a transparent touch screen (digitizer) able to register contact between the screen and the tip of the stylus 80. The stylus 80 can be of any material to make contact with the screen 105. As shown in FIG. 2A, the stylus 80 is inserted into a receiving slot or rail 350. Slot or rail 350 acts to hold the stylus when the computer system 100a is not in use. Slot or rail 350 may contain switching devices for automatically powering down and automatically power up computer system 100a based on the position of the stylus 80. The top face 100a also contains one or more dedicated and/or programmable buttons 75 for selecting information and causing the computer system to implement functions. Other buttons (icons) can be implemented within a silk screen layer material 84 on which regions 106a and 106b reside. An exemplary on/off button 95 is also shown.

FIG. 2A also illustrates a handwriting recognition pad or "digitizer" containing two regions 106a and 106b. Region 106a is for the drawing of alpha characters therein for automatic recognition (and generally not used for recognizing numeric characters) and region 106b is for the drawing of numeric characters therein for automatic recognition (and generally not used for recognizing numeric characters). The stylus 80 is used for stroking a character within one of the regions 106a and 106b. The stroke information is then fed to an internal processor for automatic character recognition. Once characters are recognized, they are typically displayed on the screen 105 for verification and/or modification.

Figure 5:
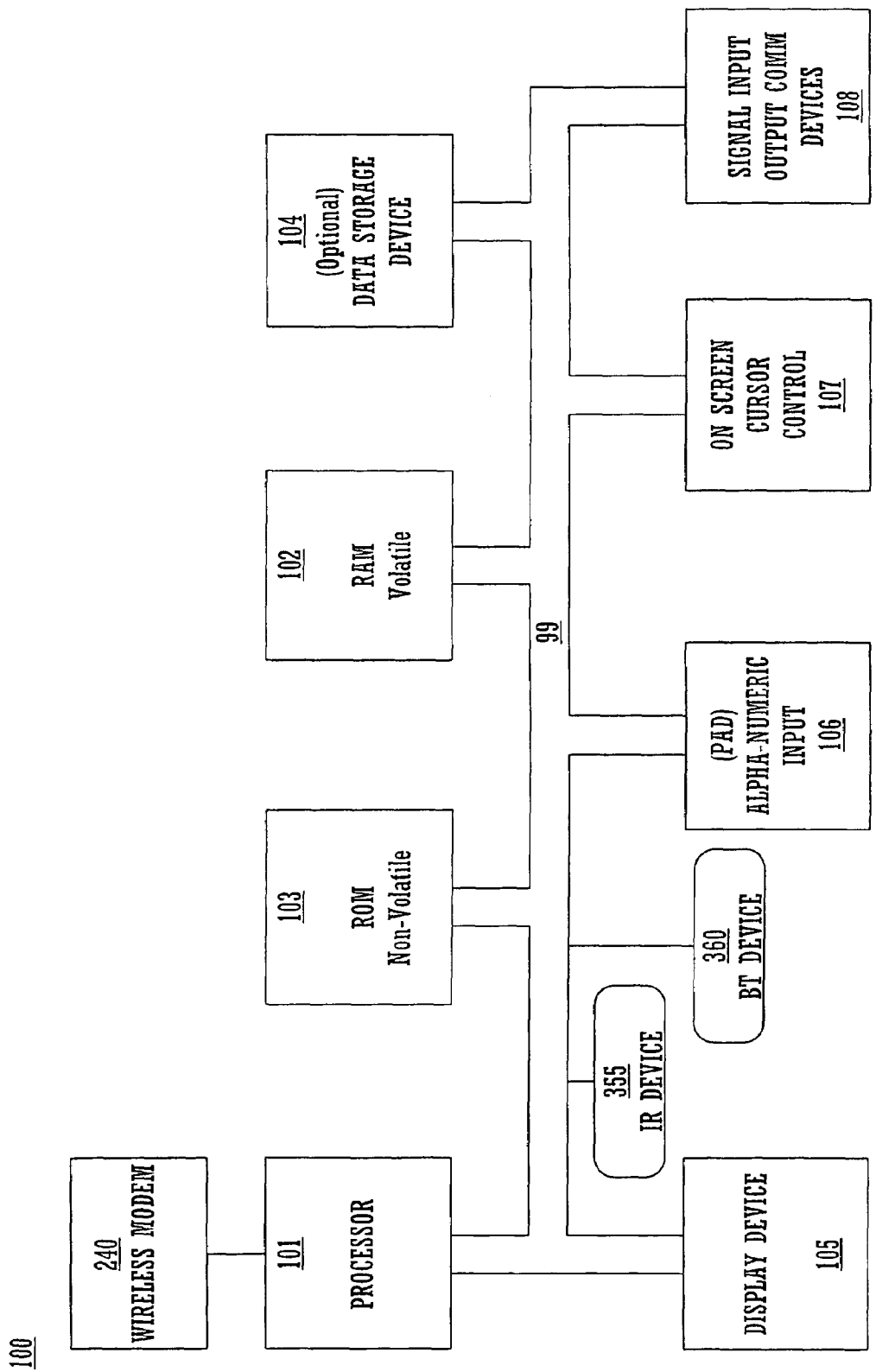
FIG. 5 is a logical block diagram of an exemplary palmtop computer system in accordance with an embodiment of the present invention.

The digitizer 160 records both the (x, y) coordinate value of the current location of the stylus and also simultaneously records the pressure that the stylus exerts on the face of the digitizer pad. The coordinate values (spatial information) and pressure data are then output on separate channels for sampling by the processor 101 (FIG. 5). In one implementation, there are roughly 256 different discrete levels of pressure that can be detected by the digitizer 106. Since the digitizer's channels are sampled serially by the processor, the stroke spatial data are sampled "pseudo" simultaneously with the associated pressure data. The sampled data is then stored in a memory by the processor 101 (FIG. 5) for later analysis.

Figure 2B:
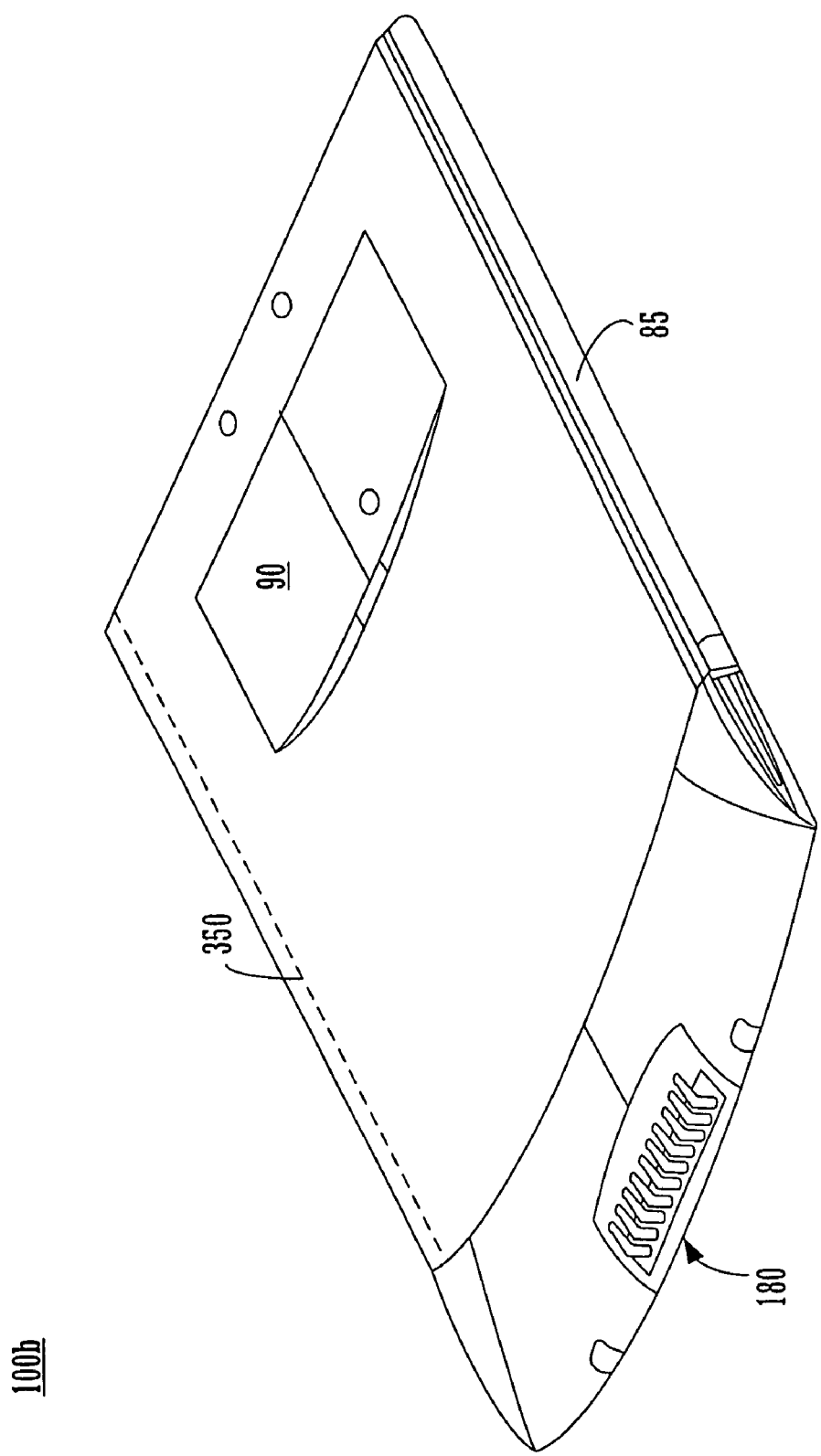
FIG. 2B is a bottom side perspective view of the exemplary palmtop computer system of FIG. 2A.

FIG. 2B illustrates the bottom side 100b of one embodiment of the palmtop computer system. An optional extendible antenna 85 is shown and also a battery storage compartment door 90 is shown. A communication interface 108 is also shown. In one embodiment of the present invention, the serial communication interface 108 is a serial communication port, but could also alternatively be of any of a number of well known communication standards and protocols, e.g., parallel, SCSI, Firewire (IEEE 1394), Ethernet, etc. In FIG. 2B is also shown the stylus receiving slot or rail 350.

Figure 2C:
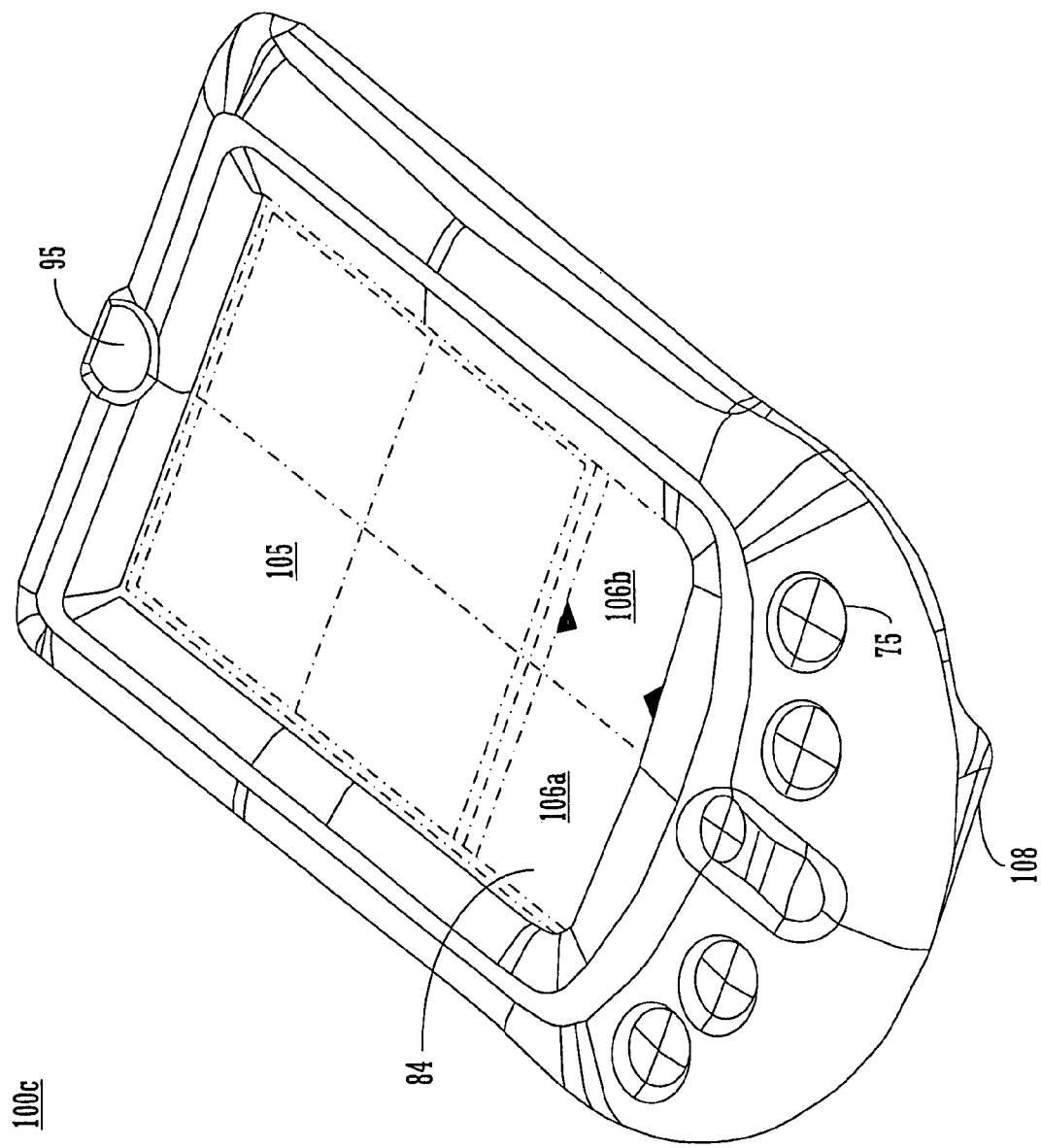
FIG. 2C is a perspective top view of another embodiment of the exemplary palmtop computer system.

FIG. 2C illustrates a front perspective view of another implementation 100c of the palmtop computer system. As shown, the flat central area is composed of a display screen area 105 and a thin silk screen layer material portion 84. Typically, the silk screen layer material portion 84 is opaque and may contain icons, buttons, images, etc., graphically printed thereon in addition to regions 106a and 106b. The display screen area 105 and portion 84 are disposed over a digitizer.

Figure 3:
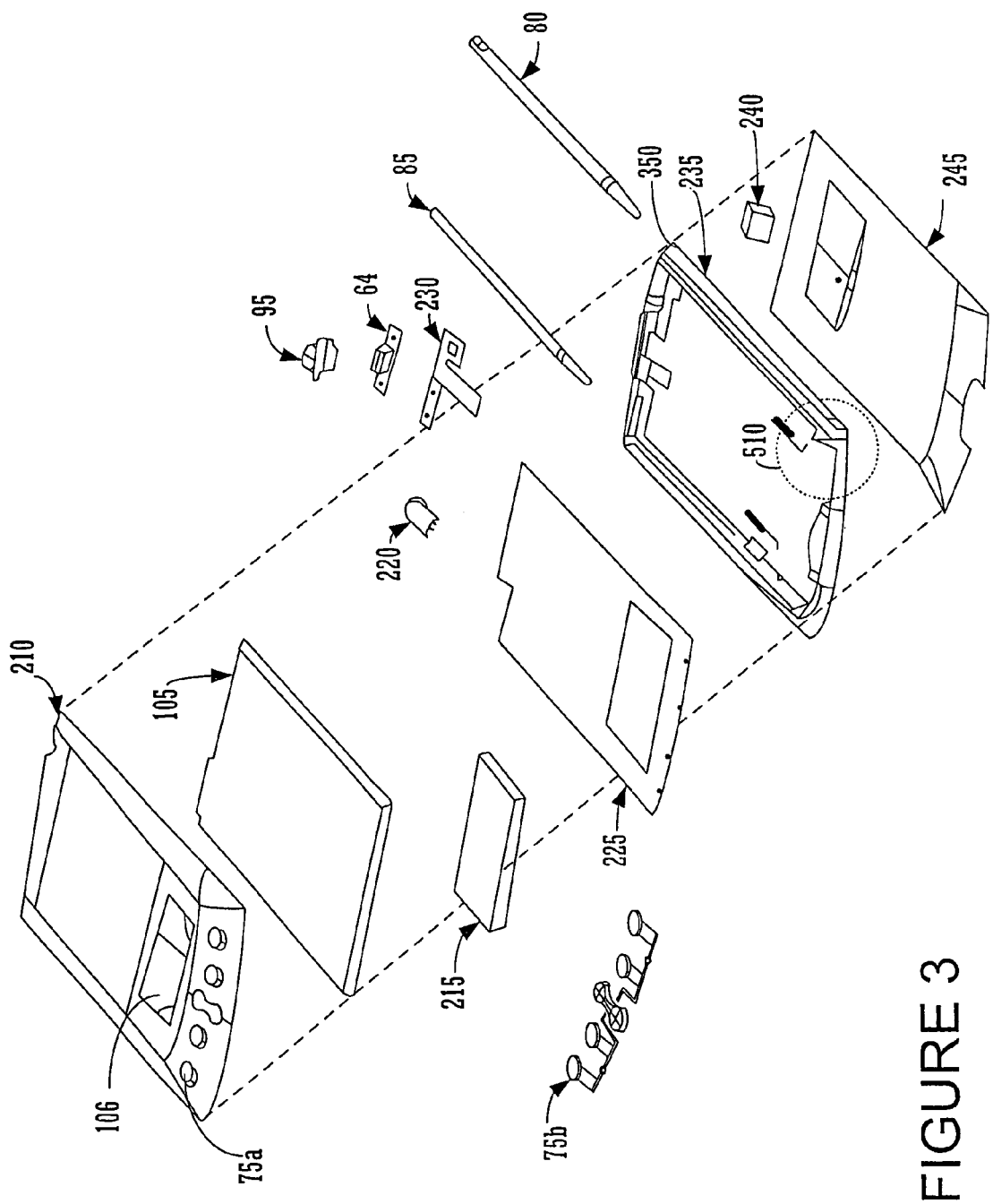
FIG. 3 is an exploded view of the components of an exemplary palmtop computer system of FIG. 2A.

FIG. 3 is an exploded view of the exemplary palmtop computer system 100. System 100 contains a front cover 210 having an outline of region 106 and holes 75a for receiving buttons 75b. A flat panel display 105 (both liquid crystal display and touch screen) fits into front cover 210. Any of a number of display technologies can be used, e.g., LCD, FED, plasma, etc., for the flat panel display 105. In one embodiment, the display 105 is a flat panel multi-mode display capable of both monochrome and color display modes.

The touch screen can be a digitizer. A battery 215 provides electrical power. Replaceable cells or rechargeable batteries can be used. Well known electronics coupled to the battery 215 can detect the energy level of the battery 215. This information can be sampled by the computer system 110 (FIG. 5) using well known techniques. The digitizer of FIG. 3 can be implemented using well known devices, for instance, using the ADS-7846 device by Burr-Brown that provides separate channels for spatial stroke information and pressure information. A contrast adjustment (potentiometer) 220 is also shown but can also be implemented electronically, e.g., by software, (FIG. 2C) without any manual knob. On/off button 95 is shown along with an infrared emitter and detector device 64. A flex circuit 230 is shown along with a PC board 225 containing electronics and logic (e.g., memory, communication bus, processor, etc.) for implementing computer system functionality. The digitizer pad is also included in PC board 225. A midframe 235 is shown along with stylus 80. Optional position adjustable antenna 85 is shown. The midframe 235 contains the stylus receiving slot or rail 350.

An optional radio receiver/transmitter device 240 is also shown between the midframe and the rear cover 245 of FIG. 3. Device 240 may include a wireless modem device and/or a wireless radio, e.g., a GSM wireless radio with supporting chipset. The receiver/transmitter device 240 is coupled to the antenna 85 and also coupled to communicate with the PC board 225. In one implementation, the Mobitex wireless communication system is used to provide two way communication between system 100 and other networked computers and/or the Internet via a proxy server. In other embodiments, TCP protocol can be used. The wireless communication capability of system 100 can be implemented using a number of well known technologies, such as, for instance, cellular phone technology, Bluetooth, wireless LAN (e.g., 802.11), etc.

Figure 4:
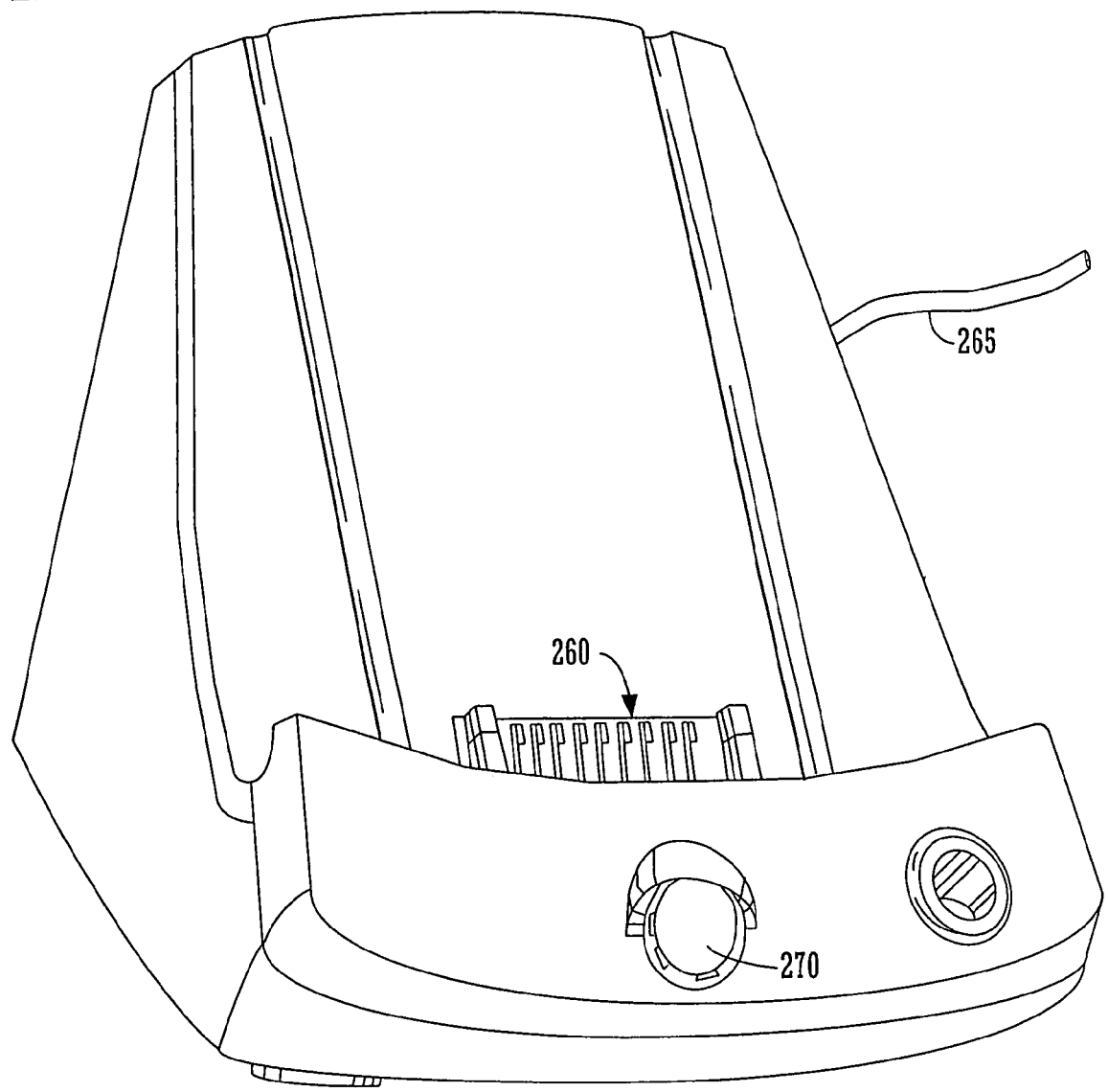
FIG. 4 is a perspective view of a cradle device for connecting a palmtop computer system to other systems via a communication interface.

FIG. 4 is a perspective illustration of one embodiment of the cradle 60 for receiving the palmtop computer system 100. In other embodiments, cradle 60 is not a stand-up device but is rather part of a cable connection between the palmtop computer system 100 and the desk top unit. Cradle 60 contains a mechanical and electrical interface 260 for interfacing with serial connection 108 (FIG. 2B) of computer system 100 when system 100 is slid into the cradle 60 in an upright position. Alternatively, a USB connection could be used. Once inserted, button 270 may be pressed to initiate two way communication between system 100 and other computer systems coupled to serial communication 265.

FIG. 5 illustrates circuitry of palmtop computer system 100, some of which can be implemented on PC board 225. Computer system 100 includes an address/data bus 99 for communicating information, a central processor 101 coupled with the bus 99 for processing information and instructions, a volatile memory 102 (e.g., random access memory RAM) coupled with the bus 99 for storing information and instructions for the central processor 101 and a non-volatile memory 103 (e.g., read only memory ROM) coupled with the bus 99 for storing static information and instructions for the processor 101. Computer system 110 also includes an optional data storage device 104 (e.g., thin profile removable memory) coupled with the bus 99 for storing information and instructions. Device 104 can be removable. As described above, system 100 also contains a display device 105 coupled to the bus 99 for displaying information to the computer user. PC board 225 can contain the processor 101, the bus 99, the ROM 103 and the RAM 102.

Also included in computer system 110 of FIG. 5 is an alphanumeric input device 106 which in one implementation is a handwriting recognition pad ("digitizer") having regions 106a and 106b (FIG. 2A), for instance. Device 106 can communicate information (spatial data and pressure data) and command selections to the central processor 101. System 110 also includes an optional cursor control or directing device 107 coupled to the bus for communicating user input information and command selections to the central processor 101. In one implementation, device 107 is a touch screen device incorporated with screen 105. Device 107 is capable of registering a position on the screen 105 where the stylus makes contact and the pressure of the contact. The display device 105 utilized with the computer system 110 may be a liquid crystal device, cathode ray tube (CRT), field emission device (FED, also called flat panel CRT) or other display device suitable for creating graphic images and alphanumeric characters recognizable to the user. In one embodiment, the display 105 utilizes color sequential scanning but could also utilize color filters with subpixels.

Signal communication device 108, also coupled to bus 99, can be a serial port (or USB port) for communicating with the cradle 60. In addition to device 108, wireless communication links can be established between the device 100 and a host computer system using a Bluetooth wireless device 360 or an infrared device 355. The wireless modem device 240 is coupled to communicate with the processor 101 but is not directly coupled to port 108.

Figure 6A:
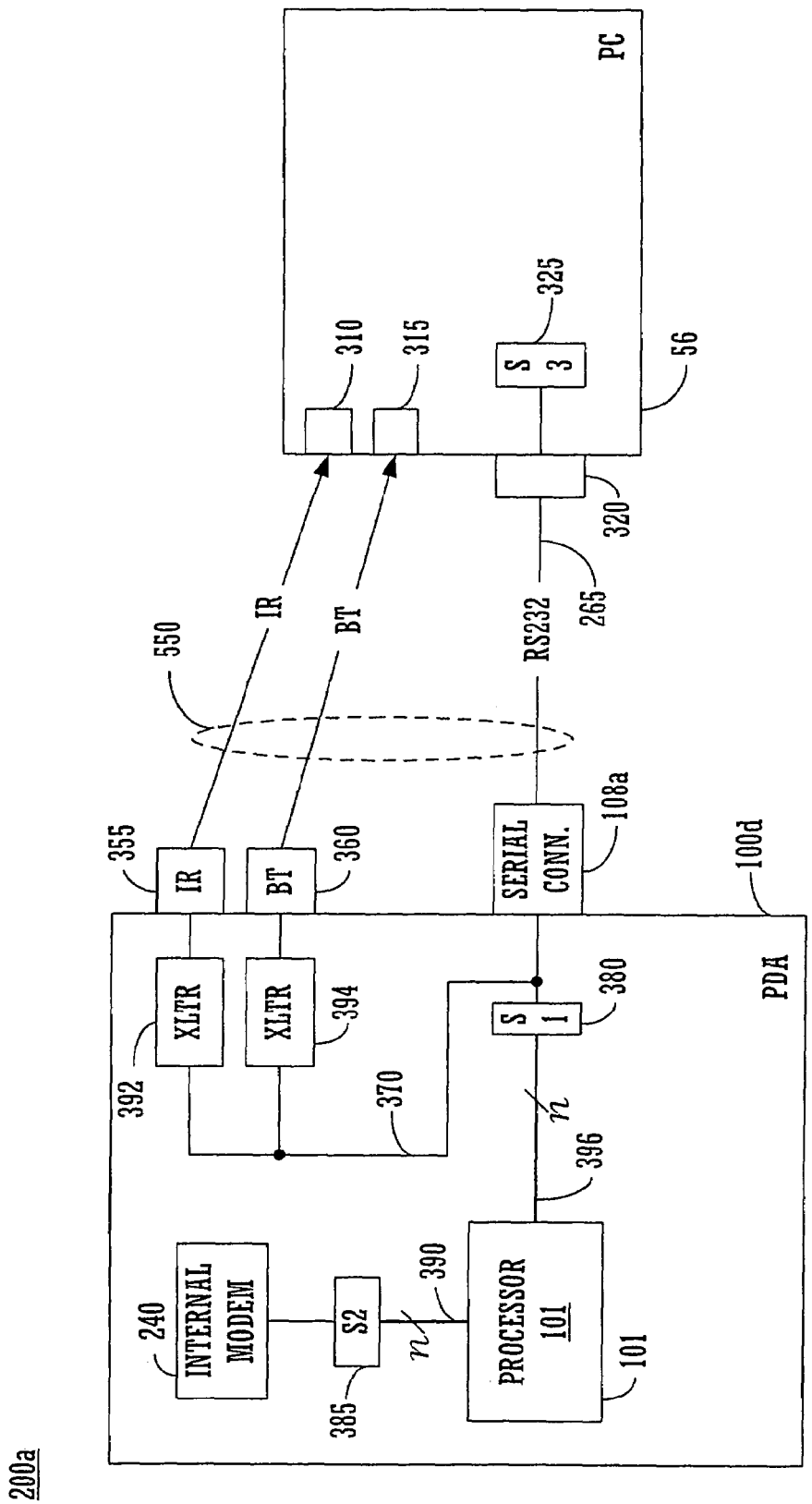
FIG. 6A illustrates a hardware diagram of a system in accordance with the present invention including a portable computer system coupled to a second or "host" computer system and providing peripheral support for the host computer system.

Wireless Communication Enabled PDA Used as Peripheral Device to Host Computer System FIG. 6A illustrates a hardware diagram 200a in accordance with an embodiment of the present invention where a portable computer system 100d is used as a peripheral device to a connected host computer system 56. The portable computer system 100d may be communicatively linked to the host computer system 56 using one of a variety of different communication mechanisms 550. In one embodiment, a wired connection 265 is used, e.g., a serial communication (RS/232) or a USB connection may be used. Alternatively, the link 550 may be established using a wireless connection, e.g., Bluetooth or infrared communication may be used. To support wired connections, an external communication device or connector 108a is present on the outside surface of device 100d.

Different communication devices are used to support the different communication mechanisms available to establish link 550. To support Bluetooth connections, an external Bluetooth communication device 360 is present on the outside surface of device 100d which communicates with a corresponding device 315 on the host computer system 56. To support infrared connections, an external IR communication device 355 is present on the outside surface of device 100d which communicates with a corresponding device 310 on the host computer system 56. Host computer system 56 contains a communication port 325 which is directly connected to a serial communication device 320 which is connected to serial line 265. When device 100d is connected to the host computer system 56 using the serial line, connector 108a is coupled to line 265 (e.g., using the cradle 60). Serial port 325 may be a UART chip.

Portable device 100d of FIG. 6A also contains an internal resource, e.g., a wireless modem 240 (which could also be a wireless radio device) that is coupled to communicate with processor 101 over an internal serial port 385. Device 240 may also communicate over a wireless network for exchange of information. Serial port 385 is a communication port and is coupled to processor 101 using n-bit bus 390. In one embodiment, port 385 is a serial UART port of the well known type. It is appreciated that the serial port 385 is directly accessible by the processor 101 because the processor 101 is directly connected to the serial port 385. Therefore, the processor 101 may directly access the internal modem 240.

Portable device 100d of FIG. 6A also contains another communication port 380 that is externally accessible to the wired communication interface 108a, and the wireless communication devices 355 and 360. In one embodiment, the wireless communication devices 355 and 360 contain respective translators 392 and 394 for translating their communication protocols to a standard serial communication protocol which exists at bus 370. In this way, the information on bus 370 is always presented according to the serial communication standard (e.g., RS/232) but could also be USB formatted. It is appreciated that the serial port 380 is directly connected to processor 101 by an n-bit bus 396. Port 380 may be a UART chip. In one embodiment, internal port 385 and externally accessible port 380 are serial communication ports. In this case, bus 390 and bus 396 each contain a respective transmit line (Tx) and a respective receive line (Rx) according to the well known RS/232 serial interface standard.

While the communication ports 380 and 385 are shown as separate devices and separate from processor 101, in one embodiment, the communication ports could also be integrated within the processor 101.

It is appreciated that regardless of the communication link used to establish communication link 550 between the device 100d and the host computer system 56, the internal communication port 385 is never directly connected to serial port 380. Therefore, the host computer system 56 is not able to directly access the internal modem 240 using the externally accessible port 380, according to the strict hardware design.

Figure 6B:
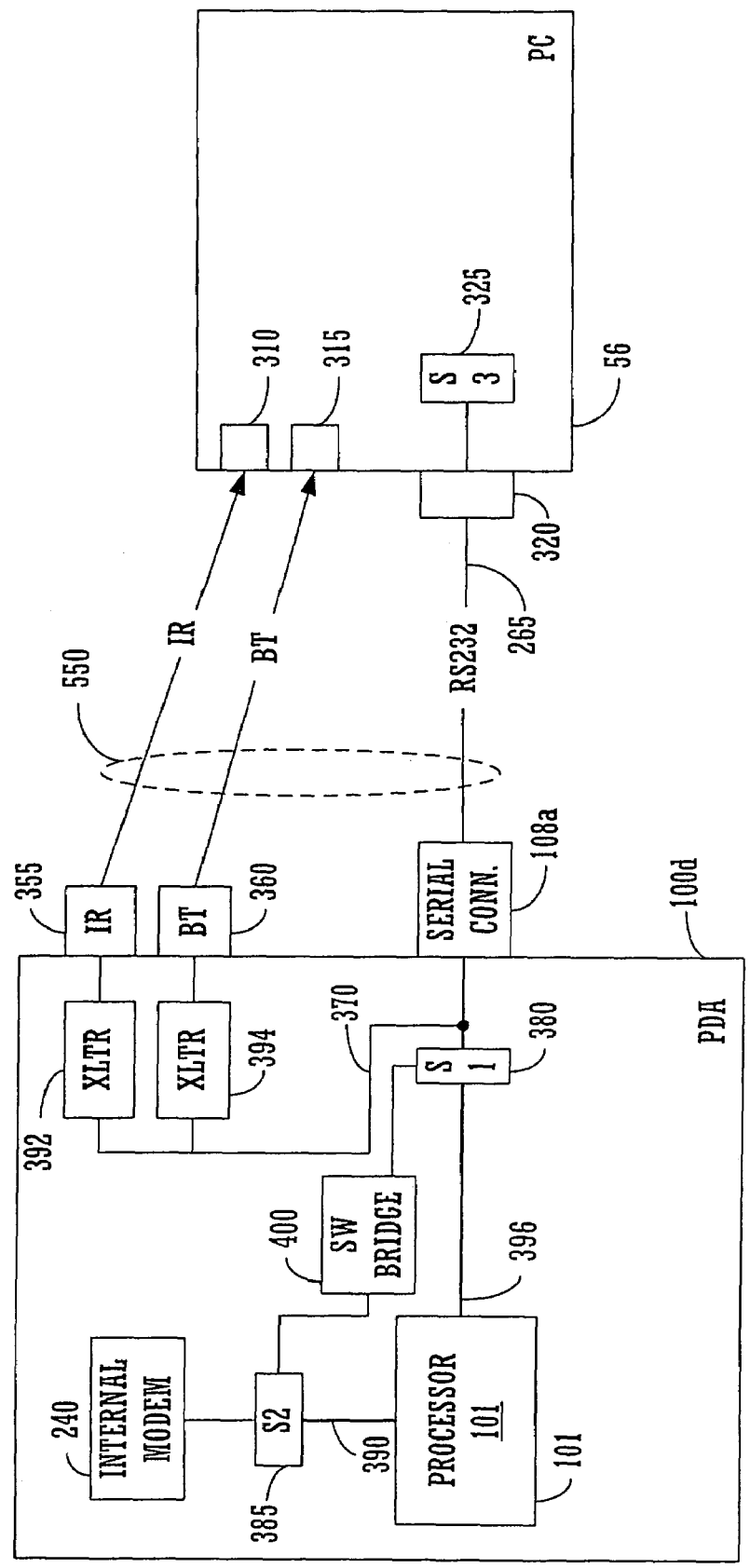
FIG. 6B illustrates a logical system diagram in accordance with the present invention including a portable computer system having a software bridge and coupled to a second or "host" computer system and providing peripheral support for the host computer system.

FIG. 6B illustrates system 200b including the bridge process 400 (or "software bridge" 400) in accordance with an embodiment of the present invention. The bridge process 400 is a software process implemented to bridge communications between externally accessible port 380 and internal port 385, as shown graphically in FIG. 6B. By using the bridge process 400, the present invention is able to provide indirect, but transparent, communication between port 380 and port 385. The bridge process 400 therefore makes the internal modem 240 accessible to the host computer system 56 over communication link 550 via port 380. By making the internal wireless modem 240 accessible to the host computer system 56, the host computer system 56 can use the internal wireless modem 240 as a peripheral device, e.g., to connect to the Internet wirelessly.

An immediate attraction of using a wireless PDA 100d as a wireless modem is based, in part, on the fact that the PDA user probably already has all of the needed hardware. The interface is very user friendly because the PDA 100d is routinely connected to the host computer system 56 for synchronization. This same link can then be used for accessing the wireless modem 240 of the PDA 100d. In other words, unlike a wireless phone, PDAs generally come with a cable attachment to the host computer system 56. Any wireless PDA 100d in its cradle can then readily be used as a wireless modem by a host computer system 56 connected to the device 100d via some connection 550. This network is useful for most host computer systems and is especially valuable for laptops.

It is appreciated that the bridge process 400 need not be integrated into the operation system (OS) of device 100d, but could readily exist as a free standing application. Generally, the bridge process 400 may behave in one of two different modes. First, the PDA 100d may use a wireless radio 240 that looks like a modem (e.g., a GSM chipset) and the software 400 then acts as a bridge between the transport to the host computer system 56 and the transport to the modem 240 (e.g., a layer two bridge). Second, the PDA 100d may use a wireless radio that does not look like a modem (like certain GPRS chipsets). In these cases, the PDA 100d may act as a termination point for the PPP link to the host computer system 56. The PDA 100d may then perform translation of IP (layer 3) data from the PPP link to the link layer used by the radio device 240. These different scenarios are described further below.

Figure 7:
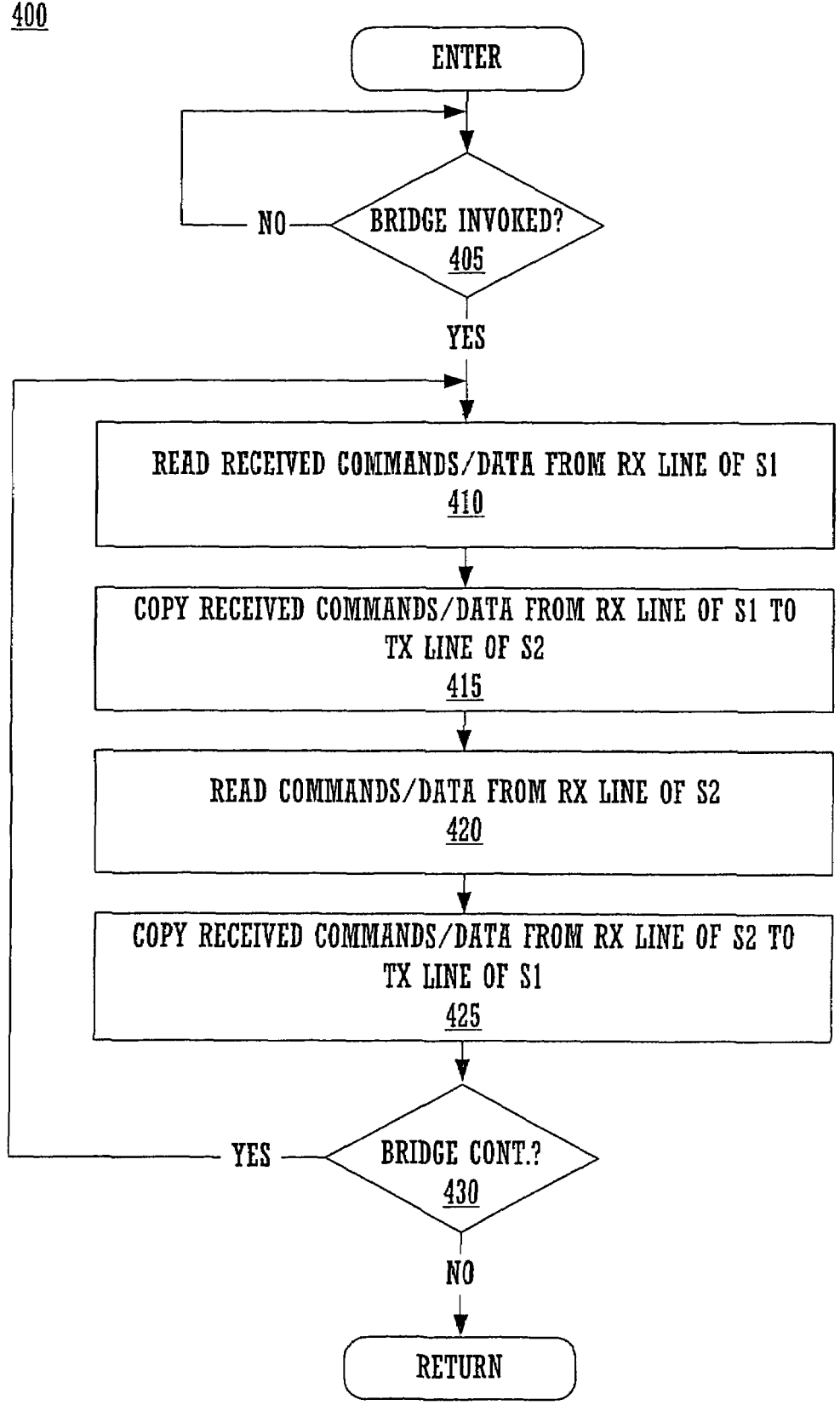
FIG. 7 is a flow diagram illustrating steps in accordance with the software bridge of one embodiment of the present invention for providing peripheral modem support for a connected host computer system.

FIG. 7 illustrates a flow diagram of steps 400 performed by processor 101 to implement the software bridge 400. It is appreciated that process 400 may be implemented as software code stored in computer readable memory units of device 100d and executed by processor 101. At step 405, if the bridge software is invoked, then step 410 is entered. Process 400 can be invoked automatically by detecting certain commands and/or data over communication link 550. Alternatively, process 400 can be invoked by a user launching the application from the OS.

At step 410, the processor 101 reads commands and data from the receive line (Rx) of the externally accessible communication port (S1) 380. At step 415, the processor 101 then relays or copies these commands and data to the transmit line (Tx) of the internal communication port (S2) 385. This supports the transparent flow of information from the host computer system 56 to the wireless modem 240. At step 420, the processor 101 reads commands and data from the receive line (Rx) of the communication port (S2) 385. At step 425, the processor 101 then relays or copies these commands and data to the transmit line (Tx) of the externally accessible communication port (S1) 380. This supports the transparent flow of information from the wireless modem 240 to the host computer system 56.

At step 430, if the bridge software is maintained, then step 410 is executed again. If not, then process 400 returns and the software enabled communication link between ports 385 and 380 is terminated.

Figure 8:
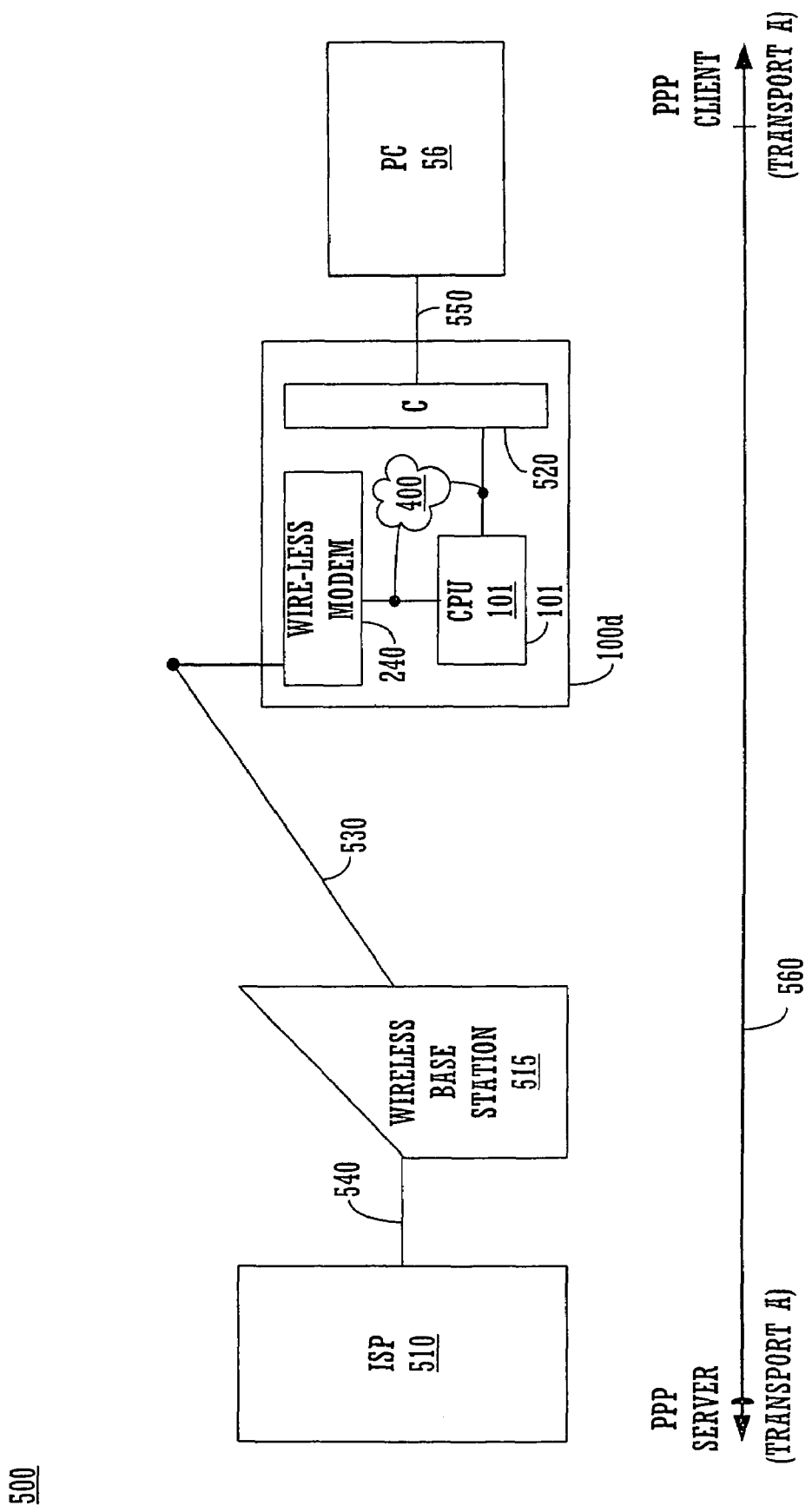
FIG. 8 is a communication protocol diagram in accordance with one embodiment of the present invention having a PPP communication framework end-to-end.
Figure 9:
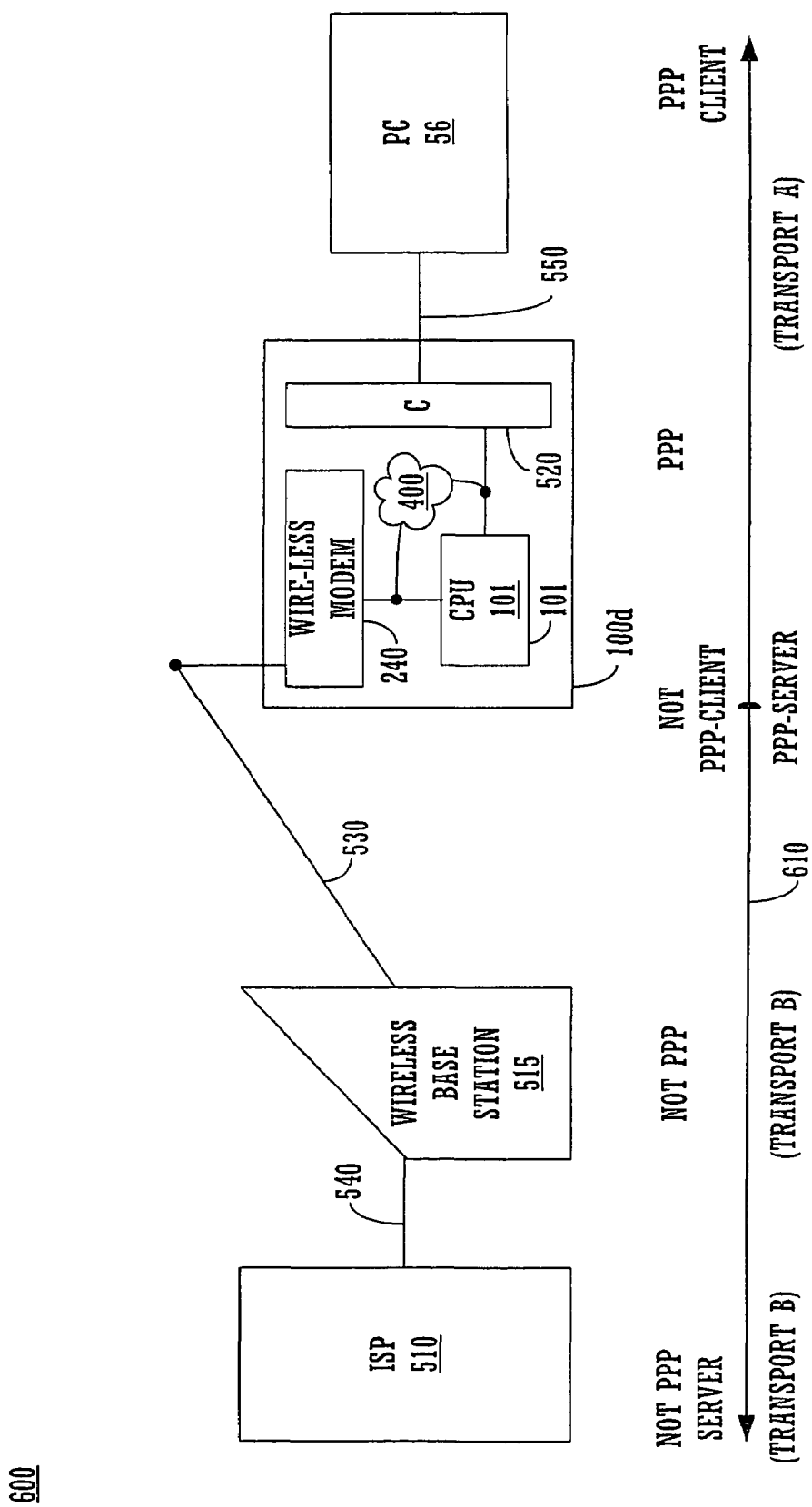
FIG. 9 is a communication protocol diagram in accordance with one embodiment of the present invention where the internal modem of the portable computer system performs NON-PPP to PPP translation for the PPP client.
Figure 10:
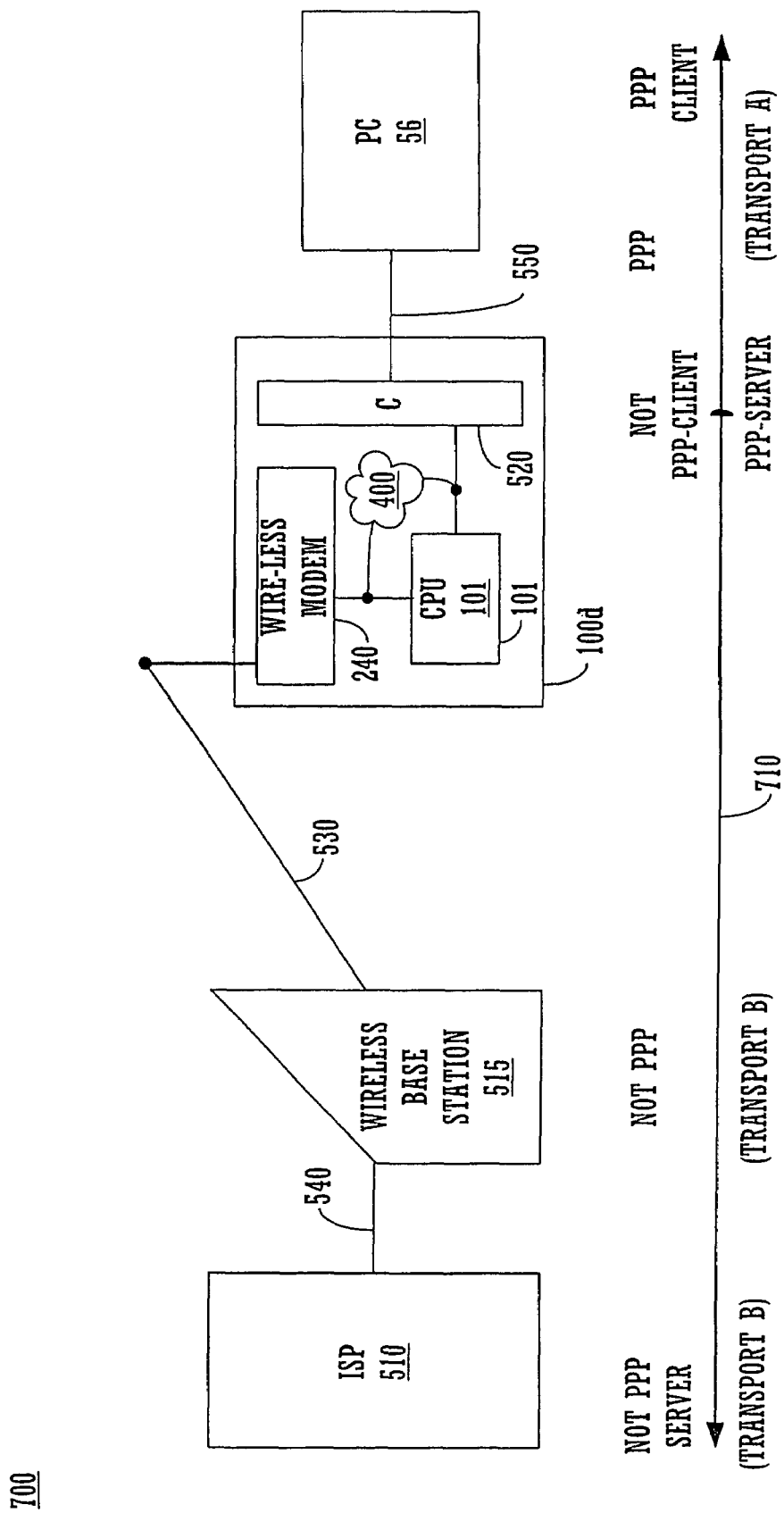
FIG. 10 is a communication protocol diagram in accordance with one embodiment of the present invention where the software bridge of the portable computer system performs NON-PPP to PPP translation for the PPP client.

FIG. 8, FIG. 9 and FIG. 10 illustrate different protocol diagrams in which no transport translation is required, in which modem transport translation is required and in which the software bridge performs the transport translation. It is appreciated that the embodiments of the present invention described in FIG. 8, FIG. 9 and FIG. 10 are applicable between any two transports, e.g., transport A and transport B. For sake of discussion, PPP-transport (transport A) and non-PPP transport (transport B) have been selected as examples only. Other transports could be used, e.g., SLIP and many well known others.

FIG. 8 illustrates a communication environment 500 in which embodiments of the present invention may operate. Communication network 500 is transport A, e.g., PPP (point-to-point protocol) end-to-end, in that a PPP server 510 communicates to a PPP client 56. This is shown in the protocol legend 560. In this network, a PDA 100d is coupled as a wireless modem peripheral to a host computer system 56 using a link 550. An Internet service provide (ISP) 510 acts as the PPP server which communicates over a physical link 540 to a wireless base station 515. Base station 515 wirelessly communicates 530 to the wireless modem 240 inside device 100d. Wireless modem 240 is PPP compliant and therefore no transport translation is required. Software bridge 400 maintains a transparent link between the internal port of the wireless modem and the externally accessible connection 520 (e.g., IR 355, BT 360 or serial 108a). This is done using PPP. A link 550 then carries commands and data to the host computer system 56 which is the PPP client.

FIG. 9 illustrates another communication environment 600 that is similar to environment 500 of FIG. 8 except that in environment 600 the ISP 510 and the wireless base station 515 are not PPP compliant, as shown by the protocol legend 610. A transport B, e.g., non-PPP transport, for example, is WCDMA. In this case, the device 100d is not a PPP client. Therefore, the modem 240 performs a translation between the non-PPP transport received over wireless link 530 and a PPP compliant transport supplied to the software bridge 400 (and vice-versa). This translation is well known. As a result, the device 100d acts a PPP server. A PPP compliant transport is then supplied over link 550 to the host computer 56 which acts a PPP client.

FIG. 10 illustrates another communication environment 700 that is similar to environment 600 of FIG. 9 except that the software bridge 400 performs the required translation, not the wireless modem 240. This translation is well known. The modem 240 is therefore fully PPP non-compliant (e.g., is transport B complaint). The resulting protocol legend 710 is shown. In this case, the device 100d is transport B compliant, e.g., not a PPP client. Therefore, the software bridge 400 performs a translation between the non-PPP transport received from the modem 240 and a PPP compliant transport supplied over link 550 (and vice-versa). As a result, the device 100d acts a PPP server. A PPP compliant transport is then supplied over link 550 to the host computer 56 which acts a PPP client.

The preferred embodiment of the present invention, a method and system for using a wireless enabled portable computer system as a wireless modem peripheral for a host computer system, is thus described. While the present invention has been described in particular embodiments, it should be appreciated that the present invention should not be construed as limited by such embodiments, but rather construed according to the below claims.

What is claimed is:

1. A method of allowing a host computer to use an electronic device as a peripheral comprising:
   receiving first commands and data over a communication link at a first communication port of said electronic device;
   copying said first commands and data to a second communication port internal to said electronic device.
   an internal wireless modem receiving said first commands and data from said second communication port;
   said internal wireless modem sending second commands and data to said second communication port; and
   copying said second commands and data from said second communication port to said first communication port.

2. A method as described in claim 1 further comprising said transmitting said second commands and data from said first communication port to said host computer system.

3. A method as described in claim 1 wherein said first communication port and said second communication port are serial communication ports.

4. A method as described in claim in claim 3 wherein said serial communication ports are implemented using UART circuitry.

5. A method as described in claim 1 wherein said electronic device is a personal digital assistant and wherein said first communication port is for communicatively coupling said personal digital assistant to said host computer system.

6. A method as described in claim 1 further comprising relaying information from a receive line (Rx) of said first communication port to a transmit line (Tx) of said second communication port.

7. A method as described in claim 1 further comprising relaying information from a receive line (Rx) of said second communication port to a transmit line (Tx) of said first communication port.

8. A method as described in claim 1 further comprising said bridge process performing protocol translation between a PPP communication protocol and a non-PPP communication protocol.

9. A method as described in claim 1 further comprising said wireless modem performing protocol translation between a PPP communication protocol and a non-PPP communication protocol.

10. A method as described in claim 1 wherein said first communication port is a wireless Bluetooth compliant external communication device for communicating with said host computer system.

11. A method as described in claim 1 wherein said first communication port is a wireless infrared external communication device for communicating with said host computer system.

12. A method as described in claim 5 further comprising communicatively coupling said host computer system to said electronic device at said first communication port of said electronic device.

13. A method as described in claim 1 further comprising a host computer system issuing said first commands and data over said communication link to said electronic device using a first communication port of said electronic device.

14. A method as described in claim 1 wherein said copying said first commands and data to a second communication port internal to said electronic device is performed by a bridge process implemented in said electronic device.

15. A method as described in claim 14 wherein said copying said second commands and data from said second communication port to said first communication port is performed by said bridge process.

16. A method as described in claim 1 wherein said second communication port is directly accessible to said host computer system.

* * * * *

UNITED STATES PATENT AND TRADEMARK OFFICE
CERTIFICATE OF CORRECTION

| | | |
|---|---|---|
| PATENT NO. | : 7,242,963 B1 | Page 1 of 1 |
| APPLICATION NO. | : 10/824756 | |
| DATED | : July 10, 2007 | |
| INVENTOR(S) | : Rich Karstens et al. | |

It is certified that error appears in the above-identified patent and that said Letters Patent is hereby corrected as shown below:

Claim 1: Column 11, line 54, change "said electronic device." to "said electronic device;"

Signed and Sealed this

Eleventh Day of January, 2011

David J. Kappos
*Director of the United States Patent and Trademark Office*